United States Patent

[11] 3,633,630

[72] Inventors: Alden W. Hanson;
Eugene R. Moore; Louis Robert Schanhals;
Hal G. Parish, all of Midland, Mich.
[21] Appl. No.: 20,318
[22] Filed: Mar. 17, 1970
[45] Patented: Jan. 11, 1972
[73] Assignee: The Dow Chemical Company
Midland, Mich.

[54] CONDUIT INSULATION
3 Claims, 1 Drawing Fig.

[52] U.S. Cl. ............................................. 138/149, 138/156
[51] Int. Cl. .............................................. F16l 9/22
[50] Field of Search ............................................. 138/140, 141, 149, 151, 156; 264/47, 51, 53; 260/2.5, 78.5, 86.7

[56] References Cited
UNITED STATES PATENTS

| | | | |
|---|---|---|---|
| 3,118,800 | 1/1964 | Snelling ........................ | 264/47 |
| 3,432,582 | 3/1969 | Bender ......................... | 264/47 |
| 3,443,984 | 5/1969 | Stewart ........................ | 264/47 |
| 3,528,458 | 9/1970 | Gaeckel ........................ | 264/47 |

*Primary Examiner*—Houston S. Bell, Jr.
*Attorneys*—Griswold & Burdick, Richard G. Waterman and Robert B. Ingraham ABSTRACT: Pipe insulation suitable for both low-pressure steam and refrigeration is prepared with benefit from constant composition styrene-maleic anhydride copolymer containing 85 to 65 weight percent styrene and 15 to 35 weight percent maleic anhydride.

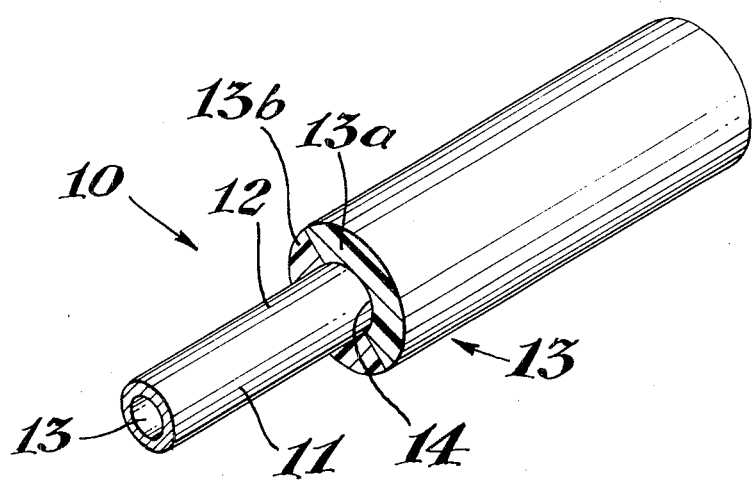
INVENTORS.
ALDEN W. HANSON
EUGENE R. MOORE
LOUIS ROBERT SCHANHALS
HAL G. PARISH
BY Robert B. Ingraham
AGENT

CONDUIT INSULATION

Many pipe-insulating materials are available which may be employed for low temperature, ambient temperature or moderate temperatures such as are encountered with hot water and low-pressure steam; that is, temperatures in the range of 250° to 265° F. Much of the pipe or process insulation that is available has specific applications or substantial disadvantages. For example, mineral insulations, such as low-density cementitious materials, have a relatively low-insulating ability but are able to withstand high temperatures. Generally, their moisture permeability makes it undesirable for low-temperature applications where moisture often accumulates in the insulating material, reducing its insulating value, and where temperature cycling results eventually in the distortion of such insulation. Generally, such insulation materials are not strong physically and it is necessary to reinforce or otherwise protect the insulation. Glass fiber mats and inorganic insulation usually have a low resistance to the permeation of moisture and are not desirable for low-temperature applications. Frequently, a skin irritation caused by glass fibers makes installation difficult and limits areas where it can be used without total enclosure. Polystyrene foam is an excellent insulating material; however, it is suitable primarily for low-temperature insulation, as polystyrene foam does not tolerate temperatures much above 180° F. The temperature sensitivity of polystyrene foam can be disadvantageous when cold storage heat exchangers are defrosted with low-pressure steam or hot water. Polystyrene foam has very low resistance to common solvents often used in adhesive and mastic coverings commonly used with process insulation. Closed cell polyurethane foams are excellent insulators for low and medium temperatures up to about 220° F. However, the polyurethane foams are moisture permeable and substantial protection is required when used in a humid environment. Swelling and buckling can occur as moisture is absorbed. Phenolic foams are generally brittle and are fabricated only with difficulty. Cellular glass has a relatively low-insulating value per unit thickness and is very brittle. Oftentimes it is desirable to fabricate such insulating materials by machining, such as by milling, routing, shaping, turning and the like. It is desirable that such insulation can be readily cut and machined in the field.

It would be desirable if there were available an improved process insulation of thermoplastic having good insulating value, readily fabricated, resistant to moisture, suitable for refrigeration applications as well as hot water and low-pressure steam.

It would also be desirable if such an insulation were resistant to solvents and had sufficient physical strength for handling during installation and was readily machined; that such an insulation would be relatively dimensionally stable under both humid and dry conditions.

These features and other advantages in accordance with the present invention are achieved in a conduit insulation, the conduit insulation comprising an elongate shaped foamed thermoplastic resinous body defining a generally centrally disposed passageway adapted to receive a process conduit, the plastic body being a polymer of from about 85 to 65 weight percent styrene and from about 15 to 35 weight percent maleic anhydride, the polymer defining a plurality of closed, noninterconnecting gas-containing cells and having a density of about 1.5 to 5 pounds per cubic foot.

Further features and advantages of the present invention will become more apparent from the following specification taken in connection with the drawing wherein the FIGURE depicts a schematic cutaway view of an assembly in accordance with the present invention generally designated by the reference numeral 10. The assembly 10 comprises a process conduit 11 having an outer surface or wall 12 and an interior passage 13. The conduit 11 is surrounded by an insulating member 13. The insulating member 13 is composed of the hereinbefore described cellular styrene-maleic anhydride copolymer foam and defines a recess 14 adapted to receive the conduit 11. Conventionally, for purposes of assembly, the insulating body 13 comprises mating portions 13a and 13b.

It is essential and critical to the practice of the present invention that the plastic or synthetic resinous foam employed be a copolymer of from about 85 to 65 weight percent styrene and from about 15 to 35 weight percent maleic anhydride. The polymeric mixture obtained by the batch polymerization of a mixture of monomer within the above-mentioned range does not come within the scope of the present invention. For example: if styrene-maleic anhydride is batch polymerized employing 3 moles of styrene and 1 mole of maleic anhydride, the resultant product is a mixture of polystyrene roughly two parts by weight, and two parts by weight of a 1:1 mole ratio copolymer of styrene and maleic anhydride. Such a polymer is not suitable for practice of the present invention.

The present invention requires the use of the so-called uniform copolymers; that is, random polymers of styrene and maleic anhydride. One method of making such a uniform polymer is disclosed in U.S. Pat. No. 2,769,804, issued Nov. 6, 1956, to A. W. Hanson, which is herewith incorporated in its entirety by reference. It is essential that the solution viscosity of the polymer be between from about 3 to about 12 centipoise, the solution viscosity being the viscosity of a 10 weight percent solution of the uniform composition copolymer in methylethylketone at 25° C. The solution viscosity is somewhat indicative of molecular weight which can be controlled by polymerization temperature, catalyst concentration and like means well known to the art. The polymer solution is readily prepared by processes well known to the art, beneficially, heat plastification of the polymer admixture with suitable blowing agent such as dichlorodifluoromethane and extrusion into the desired form. One of many ways in which foam may be beneficially prepared from such a polymer is set forth in U.S. Pat. No. 2,740,157, issued Apr. 3, 1956, to J. L. McCurdy and C. E. DeLong, herewith incorporated in its entirety by reference thereto. During the process of extrusion or preparation of the foam, the solution viscosity of the polymer may be lowered due to degradation during the processing. It should be emphasized that the polymer viscosity referred to herein is the viscosity of the polymer in the foam and not necessarily the polymer viscosity employed to form the foam. (The solution viscosity of the resin is reduced by extrusion or hot working generally in proportion to the temperature and shear conditions.) Most advantageously, foams for use in the present invention are prepared to provide foam having a polymer solution viscosity of from about 3 to 9 centipoise.

Pipe insulation in accordance with the present invention is readily prepared employing conventional fabrication techniques applicable to the preparation of foam plastic pipe insulation, such as polystyrene foam insulation. The insulation is readily formed by machining, hot wire cutting, molding or other convenient means well known to the art.

By way of further illustration, a plurality of constant composition styrene-maleic anhydride copolymers are prepared employing the method and apparatus of the Hanson patent hereinbefore mentioned. The copolymers are then foamed employing a 2.5-inch extruder and an extrusion rate of 100 pounds per hour and a blowing agent of about 80 parts by weight methyl chloride and 20 parts by weight dichlorodifluoromethane which is pumped into the extruder at a location between the feed port and the die using an arrangement substantially similar to that shown in the hereinbefore referred to McCurdy, et al. patent. The various styrene-maleic anhydride constant composition copolymers are extruded to provide a density of about 2.3 pounds per cubic foot. Samples of the polymers taken before and after extrusion. The temperature which the material reached in the extruder is set forth in table I under the heading "Gel Temperature Extruder," and the temperature of the gel just prior to extrusion from the die is shown in the column headed "Gel Temperature Cooler." The polymers were prepared to provide samples having roughly comparable solution viscosities.

TABLE I.—DEGRADATION OF 8 CENTIPOISE SOLUTION VISCOSITY OF STYRENE-MALEIC ANHYDRIDE COPOLYMER IN EXTRUSION PROCESS

| Sample No. | Maleic anhydride content [1] | Gel temperature, °C. Extruder | Gel temperature, °C. Cooler | Solution viscosity in centipoise Before extrusion | Solution viscosity in centipoise After extrusion |
|---|---|---|---|---|---|
| 1 | 0 | 200 | 120 | | |
| 2 | 10 | 208 | 135 | 8.00 | 7.89 |
| 3 | 15 | 220 | 149 | 8.02 | 7.88 |
| 4 | 25 | 235 | 180 | 7.99 | 7.81 |
| 5 | 30 | 258 | 193 | 7.91 | 7.60 |
| 6 | 35 | 274 | 207 | 8.08 | 3.9 |
| 7 | 40 | 290 | 220 | 8.05 | 2.80 |
| 8 | 48 | 308 | 246 | 8.10 | 2.20 |

[1] Weight percent.

From the foregoing samples, a plurality of boards are prepared. The boards are cut into billets 4 feet long, 6.6 inches in diameter and 2 inches thick. The cylinders are cut by means of a bandsaw along a diametrical plane, and a semicylindrical groove having a radius of about 1.2 inches is found in the resultant flat face on the semicylinders. The pipe insulation sections are subsequently employed as insulation on an air conditioner refrigeration line of 2-inch (nominal) diameter pipe employing a commercially available mastic coating or adhesive sold under the trade designation of Monolar 60-36 by Benjamin Foster Co. The covering prepared from sample 1 failed because of adhesive attack. The adhesive was removed from the portion of the pipe to be covered with foam of sample 1 and the covering wire wrapped to maintain it in position. Brine at a temperature of about −20° C. is pumped through the pipe as required for temperature control during the summer months when temperatures range from about 65° to 95° F. and relative humidity ranges from about 55 to 100 percent. After 4 months of refrigeration service, hot water is passed through the pipe at a temperature of about 220° F. for 24 hours. The water temperature in the pipe is increased in increments of 5° F. for a number of 24 hour periods. A covering portion which shows outward deformation is removed and weighed to determine weight gain or loss. The results are set forth in table II wherein F indicates failure and P indicates satisfactory performance.

TABLE II

| Sample No. | Percent maleic anhydride | Weight gain | Failure temperature, °F. 220 | 225 | 230 | 235 | 240 | 245 | 250 | 255 | 260 | 265 | 270 |
|---|---|---|---|---|---|---|---|---|---|---|---|---|---|
| 1 | 0 | .5 | F | | | | | | | | | | |
| 2 | 10 | .5 | F | | | | | | | | | | |
| 3 | 15 | .5 | P | P | P | P | P | F | | | | | |
| 4 | 25 | .5 | P | P | P | P | P | P | P | P | P | P | F |
| 5 | 30 | 1.1 | P | P | P | P | P | P | P | P | P | P | F |
| 6 | 40 | 6.2 | F | | | | | | | | | | |
| 7 | 48 | 12.1 | F | | | | | | | | | | |

Foam samples having a maleic anhydride content of 25 percent with solution viscosities ranging from 1½ to 12 centipoise are produced in a manner similar to that described in the first example hereof. Samples having a nominal density of 2 pounds per cubic foot and a nominal cell size of 0.75 millimeter are selected for machinability characterization. Each sample is placed in a jig and routed with a flat blade by a drill press. The cutting time is decreased from 18 seconds to 1 second in one second increments until the resulting smooth and flat cut surface becomes rough and begins to develop crevices. That time is recorded as an indication of the machining characteristic that is encountered during the production of pipe insulation. Results are shown in table III.

TABLE III.—MACHINING CHARACTERISTICS OF STYRENE-MALEIC ANHYDRIDE COPOLYMERS

| Solution viscosity (±0.15 centipoise) | 1½ | 2 | 4 | 6 | 8 | 10 |
|---|---|---|---|---|---|---|
| Machine time | [1] 1 | [2] 2 | 5 | 7 | 10 | 13 |

[1] Material repeatedly broke while testing.
[2] Several samples broke while testing.

Since a machining time of 10 seconds or less is desireable, the solution viscosity of the polymer of the foam should be below 10 centipoise. Employing the solution viscosities below 2 centipoise is not suitable because of the poor physical strength of foams of low-solution viscosity polymer.

Foams having a moisture content greater than 4 percent are found unsatisfactory for most pipe-insulating applications.

A plurality of foam samples are prepared in the manner of the previous illustration, each of the samples containing 25 weight percent maleic anhydride and 75 weight percent styrene. The polymers each have differing solution viscosities. The polymers are extruded in the manner of the previous illustration to provide foams varying in density from 2 to 4 pounds per cubic foot. Flexural strengths are determined on each foam sample and the results are set forth in table IV.

TABLE IV.—FLEXURAL STRENGTH OF FOAMS PRODUCED FROM 25% MALEIC ANHYDRIDE COPOLYMERS

| Sample No. | Density [1] | Viscosity [2] | Flexural strength |
|---|---|---|---|
| 9 | 2 | 2 | 26 |
| 10 | 2 | 4 | 58 |
| 11 | 2 | 8 | 79 |
| 12 | 2 | 12 | 85 |
| 13 | 2.5 | 2 | 45 |
| 14 | 2.5 | 4 | 99 |
| 15 | 2.5 | 8 | 126 |
| 16 | 2.5 | 12 | 136 |
| 17 | 3.0 | 2 | 62 |
| 18 | 3.0 | 4 | 137 |
| 19 | 3.0 | 8 | 164 |
| 20 | 3.0 | 12 | 182 |
| 21 | 3.5 | 2 | 76 |
| 22 | 3.5 | 4 | 170 |
| 23 | 3.5 | 8 | 208 |
| 24 | 3.5 | 12 | 221 |
| 25 | 4.0 | 2 | 103 |
| 26 | 4.0 | 4 | 214 |
| 27 | 4.0 | 8 | 247 |
| 28 | 4.0 | 12 | 259 |

[1] Pounds per cubic foot.
[2] Centipoise per square inch.

In a manner similar to the foregoing illustrations, eminently satisfactory conduit insulation is prepared from the hereinbefore described styrene-maleic anhydride foams.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A conduit insulation comprising an elongate shaped foamed thermoplastic resinous body defining a generally centrally disposed passageway adapted to receive a process conduit, the improvement which comprises
   the plastic body being a copolymer of from about 85 to 65 weight percent styrene and from about 15 to 35 weight percent maleic anhydride, the copolymer defining a plurality of closed, noninterconnecting gas-containing cells and having a density of about 1.5 to 5 pounds per cubic foot.

2. The insulation of claim 1 wherein the resinous body comprises two generally semicylindrical portions.

3. The conduit insulation of claim 2 having a process conduit in the passageway.

* * * * *